United States Patent
Parampottil et al.

(10) Patent No.: US 11,461,800 B1
(45) Date of Patent: Oct. 4, 2022

(54) REWARDS FOR NON-RESIDENTS ASSOCIATED WITH CONTROLLED-ENVIRONMENT FACILITY RESIDENTS

(71) Applicant: Securus Technologies, LLC, Carrollton, TX (US)

(72) Inventors: Isaac Parampottil, Coppell, TX (US); Amit Kumar Shrivastava, Montréal (CA)

(73) Assignee: Securus Technologies, LLC, Carrollton, TX (US)

( * ) Notice: Subject to any disclaimer, the term of this patent is extended or adjusted under 35 U.S.C. 154(b) by 0 days.

(21) Appl. No.: 17/127,456

(22) Filed: Dec. 18, 2020

(51) Int. Cl.
*G06Q 30/00* (2012.01)
*G06Q 30/02* (2012.01)
*G06Q 30/04* (2012.01)

(52) U.S. Cl.
CPC ..... *G06Q 30/0236* (2013.01); *G06Q 30/0232* (2013.01); *G06Q 30/04* (2013.01)

(58) Field of Classification Search
None
See application file for complete search history.

(56) References Cited

U.S. PATENT DOCUMENTS

| | | | | |
|---|---|---|---|---|
| 6,636,591 B1* | 10/2003 | Swope | ............... | H04M 15/42 379/114.15 |
| 10,034,153 B1* | 7/2018 | Smith | ............... | H04W 4/16 |
| 10,178,230 B1* | 1/2019 | Seay | ............... | H04L 65/1069 |
| 2011/0184838 A1* | 7/2011 | Winters | ............... | G06Q 30/0601 705/26.1 |
| 2013/0179949 A1* | 7/2013 | Shapiro | ............... | G06Q 30/0603 726/4 |
| 2013/0263227 A1* | 10/2013 | Gongaware | ......... | H04L 63/0861 726/4 |
| 2014/0247926 A1* | 9/2014 | Gainsboro | ............... | G10L 15/26 379/88.01 |
| 2014/0253663 A1* | 9/2014 | Edwards | ................. | H04M 3/38 348/14.01 |
| 2014/0267540 A1* | 9/2014 | Torgersrud | ........ | H04M 3/42374 348/14.01 |
| 2016/0006865 A1* | 1/2016 | Edwards | ............. | H04M 3/2281 379/196 |
| 2017/0264739 A1* | 9/2017 | Smith | ................. | H04M 3/2281 |
| 2019/0007559 A1* | 1/2019 | Hodge | .................. | H04M 3/38 |

* cited by examiner

Primary Examiner — Matthew T Sittner
(74) Attorney, Agent, or Firm — Fogarty LLP

(57) ABSTRACT

Embodiments of the present systems and methods reward non-residents associated with a controlled-environment facility resident for good behaviors related to electronic communications with a controlled-environment facility resident. One or more controlled-environment facility associated computer systems, or the like, maintain a non-resident electronic communications behavior evaluation system, monitor and/or track a non-resident's behaviors with respect to electronic communications with a controlled-environment facility resident and analyze the non-resident behavior with respect to the electronic communications with the resident. The one or more controlled-environment facility associated computer systems, or the like, may provide rewards to the non-resident for use toward electronic communications with the controlled-environment facility resident, or the like, based on good behavior determined by the analysis of the non-resident behavior with respect to the electronic communications with the resident.

20 Claims, 2 Drawing Sheets

REWARDS FOR NON-RESIDENTS ASSOCIATED WITH CONTROLLED-ENVIRONMENT FACILITY RESIDENTS

TECHNICAL FIELD

This specification is related to electronic communications between residents of controlled-environment facilities and non-residents, specifically to rewards to non-residents for use toward electronic communications with controlled-environment facility residents, and particularly to encourage good behaviors to non-residents by rewarding them with incentives to use toward electronic communications with controlled-environment facility residents.

BACKGROUND

By allowing incarcerated individuals to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences, which may be typically referred to as "video visitation," and online chat sessions.

Traditional communication services provided residents of controlled-environment facilities (such as correctional facilities) include allowing residents (incarcerated individuals) to place outbound phone calls to non-residents of the controlled-environment facility. Additionally, non-residents can typically schedule video visitation with residents (incarcerated individuals) of the controlled-environment facility and in some cases place inbound calls to controlled-environment facility residents. Other types of communication available to controlled-environment residents include the ability to exchange email and ("canned") text messages between residents and non-residents of the controlled-environment facility. Basically, all of these forms of communication aim to facilitate communication between a resident of a controlled-environment facility and a non-resident.

Additionally, over the past several years, the above-mentioned sharp increase in the U.S. incarcerated individual population has not been followed by a proportional increase in the number of prison or jail staff. To the contrary, budget pressures in local, state, and federal governments have made it difficult for correctional facilities to maintain an adequate number of wardens, officers, and other administration personnel.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide rewards to non-residents associated with a controlled-environment facility resident for good behaviors related to electronic communications with a controlled-environment facility resident. Therein, one or more controlled-environment facility associated computer systems, or the like, maintain a non-resident electronic communications behavior evaluation system, monitor and/or track a non-resident's behaviors with respect to electronic communications with a controlled-environment facility resident, and analyze the non-resident behavior with respect to the electronic communications with the resident. The one or more controlled-environment facility associated computer systems, or the like, may provide rewards to the non-resident for use toward electronic communications with the controlled-environment facility resident, or the like based on good behavior determined by the analysis of the non-resident behavior with respect to the electronic communications with the resident.

For example, the one or more controlled-environment facility associated computer systems, or the like, may monitor and/or track the non-resident's behavior during the electronic communications with the controlled-environment facility resident, such as by, at least, monitoring the electronic communications with resident for, and/or recognizing, keywords spoken by the non-resident during electronic communications with the resident.

Additionally, or alternatively, the one or more controlled-environment facility associated computer systems, or the like, may gather information related to electronic communications between the non-resident and the controlled-environment facility resident, analyze the information related to electronic communications between the non-resident and the resident, and provide the same, or other, rewards to the non-resident for use toward electronic communications with the resident based on good behavior determined by the analysis of the information related to electronic communications between the non-resident and the resident.

The information related to electronic communications between the non-resident and the controlled-environment facility resident may include, for example, an electronic communications billing history of the non-resident with respect to electronic communications with the same and/or other controlled-environment facility residents, such as a number and/or amount of chargebacks related to one or more electronic communications with the same and/or other resident(s). Likewise, the one or more controlled-environment facility associated computer systems, or the like may gather information related to support provided to the non-resident to enable electronic communications between the non-resident and the controlled-environment facility resident, analyze the information related to support provided to the non-resident to enable electronic communications between the non-resident and the resident, and provide the same, or other, rewards to the non-resident for use toward electronic communications with the resident based on good behavior determined by the analysis of the information related to support provided to the non-resident to enable electronic communications between the non-resident and the resident. The information related to support provided to the non-resident to enable electronic communications between the non-resident and the resident may, for example, include one or more support tickets.

The reward may take the form of communication time for electronic communications with the controlled-environment facility resident, one or more free electronic communication sessions with the resident, or the like. The non-resident may redeem the reward, and/or be enabled to tie the reward to an account of the resident, for communications, purchase of media, or the like.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
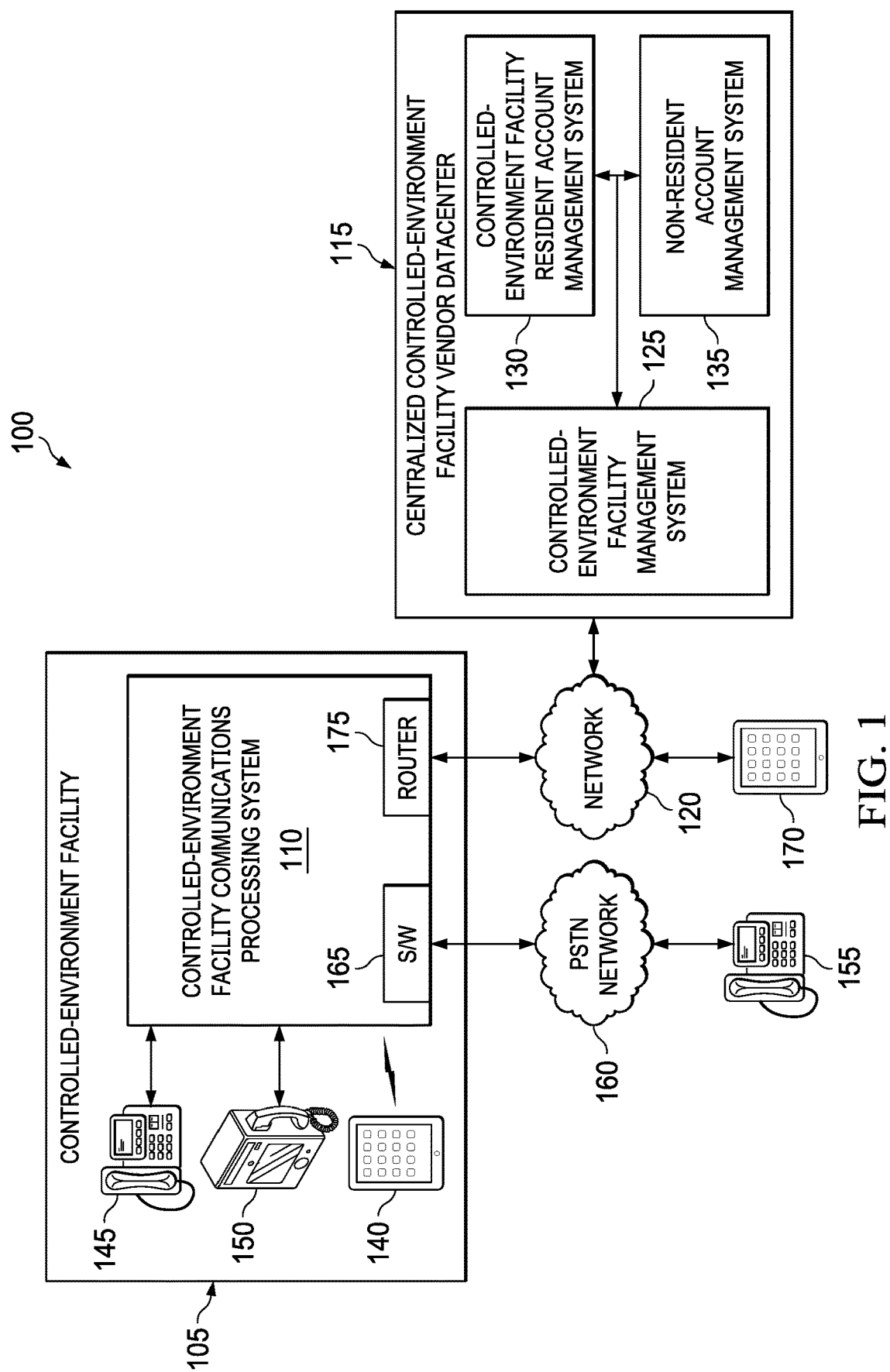
Figure 2:
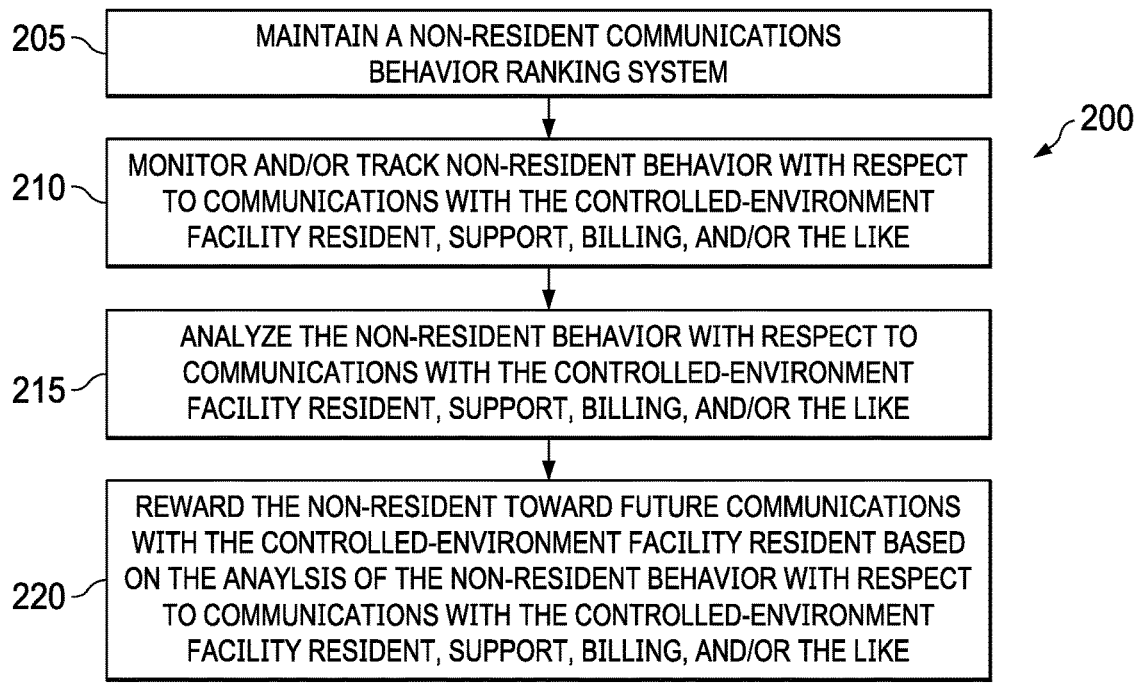
Figure 3:
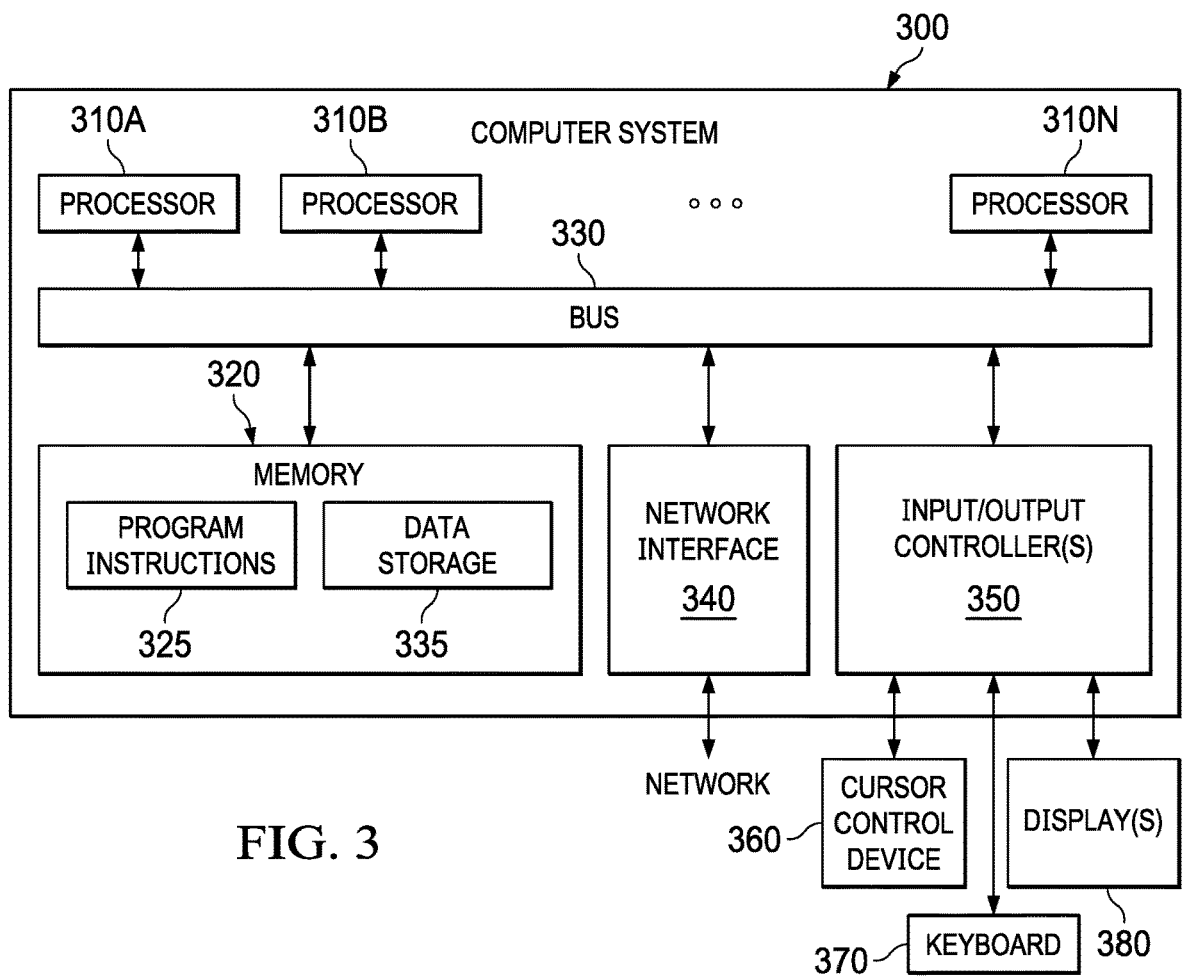

Having thus described the invention in general terms, reference will now be made to the accompanying drawings, which are not necessarily drawn to scale, and wherein:

FIG. 1 is a diagrammatic illustration of an example communications environment, wherein an example embodiment of the present systems and methods for rewarding non-residents associated with controlled-environment facility residents may be deployed in conjunction with one or more controlled-environment facilities, according to some embodiments;

FIG. 2 is a flowchart of an example process for rewarding non-residents associated with controlled-environment facility residents, in accordance with some embodiments;

FIG. 3 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as incarcerated individuals, arrestees, or detainees. It should be understood, however, that the systems and methods described herein may be similarly applicable to other types of controlled-environment facilities and their respective residents (e.g., a hospital and its patients, a school dormitory and its students, etc.).

Embodiments of the present systems and methods are related to electronic communications between residents of controlled-environment facilities and non-residents, specifically to rewards to non-residents for use toward electronic communications with controlled-environment facility residents, and particularly to "good behavior" rewards to non-residents for use toward electronic communications with controlled-environment facility residents. For example, non-residents, such as friends and family of a controlled-environment facility resident (e.g. a correctional facility incarcerated individual) will, in accordance with embodiments of the present systems and methods, receive rewards such as electronic communication (e.g. voice call and/or video visitation) minutes, free video visitations, etc. based on a friends and family electronic communication behavior evaluation system (i.e., a non-resident associated with a controlled-environment facility electronic communication behavior evaluation, rating, or ranking, system). Embodiments of the present systems and methods may employ (a) algorithm(s) that analyze the behavior of the non-resident friends and family. Embodiments may use, call information, communications vendor support ticket information with respect to the non-resident friend or family member, billing history such as chargebacks for the non-resident friend or family member, keywords (or the like, use of prohibited and/or concerning words) used (by the non-resident friend or family member) during electronic communications with the controlled-environment facility resident (incarcerated individual), communications vendor online data, such as may be provided by partners or provided via online sources such as the Better Business Bureau, credit reporting companies, background check companies, controlled-environment facility commissary companies, or the like, and/or the like, to create the friends and family electronic communication behavior evaluations.

Trouble tickets and the like, require much time and significant resources to address. Breaking communication rules, such as making three-way calls, may raise security concerns, or the like. Not paying bills may result in lost revenue for a controlled-environment facility or controlled-environment facility vendor, and bad debt ratings for the non-resident. Calls may be blocked for not following rules which leads to a loss in revenue and frustration for residents/incarcerated individuals. Lack of visibility for residents/incarcerated individuals that communicate with nefarious individuals or that have criminal records is problematic. Thus, embodiments of the present systems and methods reward non-residents associated with a controlled-environment facility resident for good behaviors related to electronic communications with a controlled-environment facility resident. One or more controlled-environment facility associated computer systems, or the like, maintain a non-resident electronic communications behavior evaluation system, monitor and/or track a non-resident's behaviors with respect to electronic communications with a controlled-environment facility resident and analyze the non-resident behavior with respect to the electronic communications with the resident. The one or more controlled-environment facility associated computer systems, or the like, may provide rewards to the non-resident for use toward electronic communications with the controlled-environment facility resident, or the like, based on good behavior determined by the analysis of the non-resident behavior with respect to the electronic communications with the resident.

Keywords may be garnered for use in embodiments of the present systems and methods by: controlled-environment facility associated computer systems monitoring, and/or reviewing recordings, looking for such prohibited and/or concerning keywords, recognized using word recognition, or the like; such controlled-environment facility associated computer systems reviewing call detail records (CDRs) and/or video detail records (VDRs) for such prohibited and/or concerning keywords, computer-recognized and noted in such CDRs and/or VDRs; and/or the like. CDRs and/or VDRs may contain participants, time, facility, terminal, session details, etc., in addition to such noted keywords, or the like By promoting good behaviors and rewarding those good behaviors by non-resident friends and family members, facilities may have more manageable incarcerated individuals (residents) and therefore less incidents at the facility with incarcerated individual (resident) behavior.

FIG. 1 is a diagrammatic illustration of an example communications environment, wherein an example embodiment of the present systems and methods for rewarding non-residents associated with controlled-environment facility residents may deployed in conjunction with one or more controlled-environment facilities 105, in accordance with some embodiments. In environment 100, controlled-environment facility communication processing system 110 may provide outbound, and in some embodiments, inbound, telephone services, videoconferencing, online chat, internet connectivity, e-messaging, email, text messaging, and other electronic communication services to residents of controlled-environment facility 105, such as electronic communication with non-residents (e.g. friends or family members of the residents) in accordance with embodiments of the present systems and methods. In some cases, such as illustrated, controlled-environment facility communication processing system 110 may be co-located with controlled-environment facility 105. Alternatively, or additionally, an external centralized communications processing system may be deployed in a controlled-environment facility vendor (e.g. a controlled-environment facility communications provider) datacenter 115, call center, or the like. That is, controlled-environment facility communication processing system 110 may be centrally and/or remotely located with respect to one or more controlled-environment facilities and/or may provide electronic communication services to multiple controlled-environment facilities, in which case, controlled-environment facility 105 is illustrated as one example. Such a controlled-environment facility vendor datacenter may be connected to such facilities via a public network (e.g. the Internet) 120 or a private network (e.g. intranet), or the like (e.g., via a secure tunneling protocol over the internet, using encapsulation). More generally, however, it should be noted that controlled-environment facility communication system 110 may assume a variety of forms, including telephony switches such as electronic switching systems, or the like, and/or and may be configured to serve a variety of facilities and/or users, whether within or outside of a controlled-environment facility.

Controlled-environment facility management system 125 of controlled-environment facility vendor datacenter 115, which may include or be associated with (a separate) controlled-environment facility resident account management system 130, (a separate) non-resident account management system 135 (which may access other public or non-public databases which contain records and/or data pertaining to nonresidents) and/or the like, may maintain resident information, (associated) non-resident information, and/or the like, which may be stored in a separate database associated and/or controlled with controlled environment facility 105, such as a controlled-environment facility administration and management system database. In a correctional environment, such a controlled-environment facility management system (125) may be referred to as a jail management system (JMS). Controlled-environment facility management system 125 and/or associated or included controlled-environment facility resident account management system 130, may maintain resident (trust) accounts to the benefit of the respective resident, such as resident commissary accounts, resident communications accounts, which may be used to pay for purchase of a personal controlled-environment facility resident communication and/or media device (140), personal controlled-environment facility resident communication and/or media device accessories (headphones, wearables, etc.), electronic communications (such as phone calls, video visitation, internet chats, emails, text messages, e-messages), and/or the like. Controlled-environment facility management system 125 and/or associated or included non-resident account management system 135, may maintain (a) non-resident (communication) account(s), which may be used to pay for, electronic communications (such as phone calls, video visitation, internet chats, emails, text messages, e-messages), and/or the like, with one or more residents of the/a controlled-environment facility.

Residents may use more-or-less conventional telephones 145 to access certain communication services. However, in accordance with embodiments of the present systems and methods, residents may also use a controlled-environment facility resident communication and/or media device 140, communal controlled-environment facility resident communication and/or media terminals 150 or the like. For example, personal computer wireless devices, such as a tablet computing device or smartphone (140), which may have been adapted and/or approved for use in controlled-environment facility, may be used by controlled-environment facility residents for electronic communication. Such a personal resident device may be referred to as a "personal controlled-environment facility resident communication and/or media device," an Intelligent Resident Device (IRD), or the like, in controlled-environment facilities, in general. These may also be referred to as an "incarcerated individual personal communications and/or media device," an Intelligent Incarcerated individual Device (IID), or the like, in a correctional institution environment.

As noted, a resident may use a "communal controlled-environment facility resident communication and/or media terminal" 150, or the like, to place voice calls, as well as for video communication, execution of other application programs (apps), including media apps, games, job search apps, etc. Such a controlled-environment facility video communication terminal may be referred to as an Intelligent Facility Device (IFD), which may be a video phone particularly adapted for use in a controlled-environment facility. Generally speaking, multiple controlled-environment facility resident communal communication and/or media terminals/IFDs 150 are disposed in a controlled-environment facility, and may be disposed in a visitation room, in a pod, as part of a kiosk, as an alternative to a controlled-environment facility communication kiosk, etc. As will be appreciated, IRD 140, IFD 150, or other similar devices have video conferencing capabilities, or the like, to enable a party to participate in video communication sessions with other call parties, such as non-residents of the controlled-environment facility, via video communication, secure online chat, etc. In some cases, IFD 150 may assume the form of any computer, tablet computer, smart phone, etc., or any other consumer device or appliance with videoconferencing capabilities. For example, in a correctional facility environment a tablet computing device (e.g., an IRD 140) may be mounted on a wall, in a hardened case, as a controlled-environment facility resident communal communication and/or media terminal or IFD (150). IFD 150 may also take the form of a docking station adapted to support and interface with an IRD 140 to provide communication, data, or other services.

Personal controlled-environment facility resident communication and/or media devices, IRDs 140, may be tablet computing devices, smartphones, media players, smart watches, or the like adapted and/or approved for use by residents of the controlled-environment facility (within the controlled-environment facility). Each IRD 140 may be particularly adapted for use in a controlled environment. For example, in a correctional institution, jail, or the like, such an IRD, or IID, may have a specifically adapted operating system and/or may be "stripped-down," particularly from the standpoint of what apps and/or hardware are provided or allowed on IRD 140, and/or connectivity afforded such an IRD. For example, such an IRD may employ an operating system kernel built for use in such an IRD in a controlled-environment facility. As a further example, the IRD may be adapted to only connect to a network provided by the controlled-environment facility, and/or in only certain locations, within the controlled-environment facility, such as may be controlled by availability of Wi-Fi access, or the like, only being available in certain areas. That is, for example, where streaming and/or downloading may be compartmentalized, leveraging the (concrete and steel) structure (i.e. construction, layout, etc.) of the controlled-environment facility, for example, limiting the availability of a Wi-Fi signal, providing the stream through the placement of wireless access points, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like. Also, in accordance with embodiments of the present systems and methods, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRDs might include apps of particular interest to residents of the controlled-environment facility. For example, IRDs provided to incarcerated individuals of correctional facilities, might include apps that may be of particular use to an incarcerated individual, in general, such as access to a legal research service, or of more specific interest, such as providing an incarcerated individual nearing release, access to employment searching apps or the like. Hence, such incarcerated individual IRDs may be used to help soon to be released incarcerated individuals transition. For example, the IRD may be used to communicate with a future employer, or the like. As such, IRDs may be sponsored, or otherwise subsidized by organizations or companies, assisting with the transition of incarcerated individuals into society, or the like.

Personal controlled-environment facility resident communication and/or media devices, IRDs, IIDs, incarcerated individual personal communications and/or media devices (generally, 140), communal controlled-environment facility resident communication and/or media terminals (150), or the like, may be referred to generally (herein), individually or collectively as "controlled-environment facility resident communication and/or media device(s)."

In various embodiments, to access voice (or video) communication services, a resident may initiate approved telephone services by lifting the receiver on telephone 145 or IFD 150, and/or otherwise initiating a call, such as by launching a communications app on IRD 140 (or IFD 150). At which time, the resident may be prompted to provide a personal identification number (PIN), other identifying information and/or biometrics. An Interactive Voice Response (IVR) unit (not shown, but which may be integrated into controlled-environment facility communication processing system 110) may generate and play a prompt, or other messages, to the resident on device 140, 145 or 150. Under the control of controlled-environment facility communication processing system 110, devices 140, 145 or 150 may be capable of connecting to a non-resident's (i.e., a person not incarcerated or otherwise committed to a controlled-environment facility) telephone 155 across a Publicly Switched Telephone Network (PSTN) 160. For example, telephone 155 may be located at a non-resident's home or office, at a resident visitation center, etc. Telephony switch 165, in controlled-environment facility communication processing system 110, may be used to connect calls across PSTN 160. Additionally or alternatively, the non-resident may communicate using device 170, which may be a mobile phone, tablet computing device, personal computer, or the like, which may be connected through an Integrated Services Digital Network (ISDN), Voice-over-IP (VoIP), or packet data network (such as, for example the Internet), a wireless communications network, or the like 120. Telephony router 175 of controlled-environment facility communication processing system 110 is used to route data packets associated with a call connection to device 170. For example, a non-resident party may have a device 170 with a built-in front-facing camera, or the like, and an integrated display (e.g., a smart phone, tablet, etc., as illustrated), a personal computer with a webcam, etc. A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards.

In environment 100 inbound phone or video call processing functionality may be integrated into, or otherwise (separately) associated with controlled-environment facility communication processing system 110, controlled-environment facility datacenter 115, or the like.

In accordance with various embodiments, systems and methods enabling inbound calls to controlled-environment facility resident telephone numbers may employ an inbound (and outbound) calling platform which may be integrated into, or otherwise (separately) associated with controlled-environment facility communication processing system 110, controlled-environment facility datacenter 115, or the like. This inbound (and outbound) calling platform may assign a telephone number to each resident and associates a routable (IP) address of each personal controlled-environment facility resident media and/or communications device (150) with such telephone number. This calling platform may present an online directory to accessing inbound callers (e.g., non-residents) that lists residents the caller is allowed to call, the telephone number(s) of such resident(s), and whether such residents and their communications devices are ready to receive a call. The calling platform reconfirms such information upon an inbound call being placed to a telephone number assigned to a resident and signals the resident communications device associated with the resident assigned that telephone number. A controlled-environment facility communication processing system routes the call to the resident communications device associated with the resident called and connects the call.

In some (other) embodiments, an inbound phone or video call processing functionality, may be embodied by an inbound call processing server, or the like, which may be integrated into, or otherwise (separately) associated with controlled-environment facility communication processing system 110, controlled-environment facility datacenter 115, or the like. This inbound call processing server, or the like, may process inbound calls to controlled-environment facility resident communication and/or media devices 140 or 150. Such inbound call processing functionality may be configured receive inbound calls from non-residents, such as calls from non-resident devices 155 or 170, and to route such inbound calls to an authenticating server, or the like, which may be integrated into the inbound call processing server, in whole or part, or separate therefrom.

The inbound call from the non-resident may be intended by the non-resident to be directed to the personal controlled-environment facility resident communication and/or media device (140) of the resident the non-resident wishes to call. In such cases, the inbound call processing server may intercept the inbound call. Additionally, or alternatively, inbound resident call server 132 may host a central phone number, such as a toll-free number, for calls directed to personal controlled-environment facility resident communication and/or media devices 140. In such embodiments, an inbound call from a non-resident device (105, 106, 109, 112 or 113) may be directed to the central phone number and inbound resident call server 132 may correspondingly be configured to accept requests from non-residents for calls into residents via their controlled-environment facility resident communication and/or media device (140).

The inbound call processing server may also be configured to confirm that the controlled-environment facility resident communication and/or media device (140) being called is active (i.e. available and reachable to receive the inbound call, etc.) or inactive (i.e. the called controlled-environment facility resident communication and/or media device is not active or not available, busy, etc.). An authenticating functionality, may be a part of the inbound call functionality, and may be embodied by an inbound call processing server, or the like, which may (also) be integrated into, or otherwise (separately) associated with controlled-environment facility communication processing system 110, controlled-environment facility datacenter 115, or the like. The authenticating server may authenticate that a non-resident is associated with an inbound calling account maintained by non-resident account management system 135 and confirm that that the inbound calling account is associated with an Address Identifier (AID) number, or the like of the controlled-environment facility resident communication and/or media device (140) the non-resident has indicated (i.e. the device the non-resident has called or the device of the resident the non-resident has requested). This unique AID may be tied to a resident name and number and a Media Access Control (MAC) address of the subject controlled-environment facility resident communication and/or media device (140). The MAC address and AID are Hardcoded Addresses (HCAs), which may also include a processor number, or the like for uniquely identifying the subject controlled-environment facility resident communication and/or media device (140). Further, the authenticating server may receive, via the controlled-environment facility resident communication and/or media device, a PIN entered by the resident and which should be associated with the resident the inbound call is directed to.

Additionally, or alternatively, the inbound call processing server, or the like, which may be integrated into, or otherwise (separately) associated with controlled-environment facility communication processing system 110, controlled-environment facility datacenter 115, or the like, may receive an incoming communication request from a non-resident. This incoming communication request from a non-resident may be directed to a telephone number assigned to a controlled-environment facility resident and/or a personal controlled-environment facility resident communications and/or media device (140) associated with the resident, for a communication with the resident. The inbound call processing server, or the like, may then send an event notice to the device associated with the resident or a communal controlled-environment facility resident communication and/or media terminal 150 (currently) associated with the resident (e.g. near the resident, in use by the resident, etc.), in response to receipt of the incoming communication request. The device or terminal (140 or 150) may then present an option to accept the event notice and the inbound call processing server, and/or the device or terminal may then connect an outgoing communication from the device or terminal (140 or 150) to a device (155, 170) associated with the non-resident, in response to acceptance of the event notice, to carry out the incoming communication.

In addition to providing certain visitation and electronic communication operations, controlled-environment facility communication processing system 110 may attempt to ensure that a resident's calls, video conferences, online chats, etc. are performed only with non-residents whose identities, devices, email addresses, phone numbers, etc. are listed in that resident's Pre-Approved Contact (PAC) and/or Pre-Approved Number (PAN) list. Each resident's PAC and/or PAN list(s) may be stored, for example, in (a) database(s) maintained by controlled-environment facility vendor datacenter 115 (such as by controlled-environment facility management system 125, or the like), and/or the like. In addition to PAC and/or PAN list(s), controlled-environment facility vendor datacenter 115 (e.g., controlled-environment facility management system 125), and/or the like, may also store Resident Profile Data (RPD), as well as communication and/or visitation rules applicable to each resident. This, or another, controlled-environment facility vendor datacenter 115 (controlled-environment facility management system 125, controlled-environment facility resident account management system 130, non-resident account management system 135, and/or the like) database(s) may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. In some implementations, controlled-environment facility communication processing system 110 may be configured to perform communication monitoring operations, such being configured to monitor and/or record communication sessions (e.g., as electronic video files).

Computer-based environment components of embodiments of the present systems and methods may include programing and/or hardware to implement such embodiments. This programming may take the form of stored program instructions, programed firmware, or the like, while hardware might take the form of an Application Specific Integrated Circuit (ASIC), or the like, to carry out such aspects of embodiments of the present systems and methods.

In operation, embodiments of an electronic communications rewards system for providing non-residents associated with a controlled-environment facility resident rewards for good behaviors related to electronic communications with controlled-environment facility residents may be, or employ one or more controlled-environment facility associated computer systems, such as controlled-environment facility communication processing system 110, controlled-environment facility management system 125, non-resident account management system 135, and/or the like. Various elements of the present systems and methods may be implemented as one or more modules, such as one or more modules of controlled-environment facility communication processing system 110, controlled-environment facility management system 125, non-resident account management system 135, and/or the like. Embodiments of such (a) system(s) for providing good behaviors (electronic communications) rewards to non-residents associated with controlled-environment facility residents may maintain a non-resident electronic communications behavior system, or the like, such as in association with non-resident account management system 135, or the like. As referred to herein, "electronic communication(s)" may include telephone calls, videoconferencing (video visitation), online chat, e-messaging, emails, text messaging, games, movies, music, education modules, spiritual modules, third party vendor apps (commissary), and/or other electronic communication(s) which may be dispersed in the form of credit for a non-resident, rewards card or credit to an incarcerated individual's trust account or incarcerated individual's debit account, such as discussed below.

This non-resident rewards system may monitor and/or track a non-resident's behavior with respect to electronic communications with a controlled-environment facility resident, such as by leveraging the monitoring functions of controlled-environment facility communication processing system 110, or the like to monitor and/or track a non-resident's behaviors during electronic communications with a controlled-environment facility resident. For example, the non-resident rewards system may, at least, monitor the electronic communications with the controlled-environment facility resident for, and/or recognize, keywords spoken by the non-resident during electronic communications with the controlled-environment facility resident. Additionally, or alternatively, the non-resident rewards system may review keywords noted in CDRs, and the like. Other behaviors monitored for in accordance with embodiments of the present systems and methods may include three-way calls, censored images, non-payment, criminal history, chargebacks, etc. The non-resident rewards system analyzes the non-resident behavior with respect to the electronic communications with the controlled-environment facility resident, such as by, in the case of keyword recognition or the like, by scoring monitored, recognized and/or CDR-noted or VDR-noted prohibited and/or concerning keywords, and/or the lack thereof, spoken by the non-resident during electronic communications with the controlled-environment facility resident and/or the presence of other behaviors such as three-way call attempts, display of censored images, location, or the like, by the non-resident.

Rewards may be provided by the non-resident rewards system to a non-resident (i.e. in a non-resident account maintained by a controlled-environment facility communications vendor, or the like, such as in non-resident account management system 135) for use toward future electronic communications with the controlled-environment facility resident. These rewards are, in accordance with embodiments of the present systems and methods, based on good behaviors determined by the analysis of the non-resident behaviors with respect to the electronic communications with the controlled-environment facility resident or otherwise. The rewards may take the form of communications time/minutes for electronic communications with the controlled-environment facility resident, (a) free electronic communication session(s) with the controlled-environment facility resident, and/or the like, such as may be credited to the non-resident's account maintained by non-resident account management system 135, or the like. The rewards may also be tied to the communications account of the resident, such as may be maintained by controlled-environment facility resident account management system 130. Such rewards tied to the resident's account may be used, such as subject to approval by the non-resident, for electronic communications by the resident (with the non-resident).

As noted, these rewards may be based on non-resident conduct during the electronic communication. The non-resident rewards system may additionally, or alternatively, gather information related to electronic communications between the non-resident and the controlled-environment facility resident and analyze this information related to electronic communications between the non-resident and the controlled-environment facility resident. In such embodiments, the non-resident rewards system may provide (additional) rewards (or adjust awards) to the non-resident (account) for use toward (future) electronic communications with the controlled-environment facility resident based on good behaviors determined by such analysis of the information related to electronic communications between the non-resident and the controlled-environment facility resident. For example, the non-resident rewards system may gather information related to an amount of (technical) support provided to the non-resident, such as may be provided by a controlled-environment facility communications vendor, to enable electronic communications between the non-resident and the controlled-environment facility resident, analyze this information of related provided support, and provide (or adjust) rewards to the non-resident (account) based on an amount of support provided to the non-resident to enable electronic communications between the non-resident and the controlled-environment facility resident. In such embodiments, the information related to the amount of support provided to the non-resident may include the amount, and/or scope of one or more support ticket(s) generated by the non-resident requesting support, the non-resident's cooperation with support efforts (e.g., willingness to follow support instructions, and the like) and/or the like. Additionally, or alternatively, the information related to electronic communications between the non-resident and the controlled-environment facility resident gathered and analyzed may include the non-resident's billing history, for example promptness of payment, a number and/or amount of chargebacks, and/or the like.

Rewards may be redeemed during initiation of, or upon completion of, an inbound call or other electronic communication by/from the non-resident in accordance with an inbound call embodiment described above. Also, in accordance with embodiments of the present systems and methods, a non-resident with a rewards balance may be contacted, such as by function of controlled-environment facility communications vendor datacenter 115 (e.g., by controlled-environment facility management system 125) encouraging the non-resident to communicate with the resident. Such contact may include ready access to a controlled-environment facility communication interface to initiate such communication with the resident. In embodiments where the rewards are tied to the communications account of the resident, such as by the non-resident indicating such a tie, the tied rewards may be redeemed during initiation of, or upon completion of, an outbound resident call or other electronic communication in accordance with an above-described outbound resident call. Alternatively, or additionally, in various embodiments, the resident may be enabled to log into an app and purchase media, or the like, or credits may be automatically applied to communications, media purchases, or the like.

FIG. 2 is a flowchart of example process 200 for rewarding non-residents associated with controlled-environment facility residents, in accordance with some embodiments. Therein, at 205, one or more controlled-environment facility associated computer systems, such as a controlled-environment facility communication processing system (110), a controlled-environment facility management system (125), a non-resident account management system (135), and/or the like, establishes and maintains a non-resident electronic communications behaviors evaluation system. The controlled-environment facility associated computer system(s) at 210 monitors and/or tracks non-resident behaviors during, and/or related to, electronic communications with the controlled-environment facility resident. At 215 the controlled-environment facility associated computer system(s) analyze the non-resident behavior related to, and/or during, the electronic communications with the controlled-environment facility resident, and at 220, rewards the non-resident for, such as by crediting time/minutes or (a) free electronic communications session(s)/media to an electronic communications account, such as may be maintained by a non-resident account management system (135), and/or the like, for use toward future electronic communications or media purchase with the controlled-environment facility resident. As noted, these rewards may also be tied to the communications account of the resident, such as may be maintained by a controlled-environment facility resident account management system (130). Such rewards tied to the resident's account may be used, such as subject to approval by the non-resident, for electronic communications by the resident (with the non-resident), or otherwise.

Thereafter, rewards may be redeemed during subsequent initiation of, or upon completion of, a subsequent inbound call or other electronic communication by or from the non-resident, such as in accordance with an inbound call embodiment described above. Also, a non-resident with a rewards balance may be proactively contacted, such as by the controlled-environment facility communications vendor datacenter (115) (e.g., by controlled-environment facility management system 125) to encourage the non-resident to communicate with the resident. This contact may provide ready access to a controlled-environment facility communication interface to intimate such a communication with the resident. As also noted, in implementations where the rewards have been tied to a communications account of the resident (by the non-resident indicating such a tie) the tied rewards may be redeemed during initiation of, or upon completion of, an outbound resident call or other electronic communication, in accordance with the outbound call embodiment(s) descried above.

In some implementations, the monitoring and/or tracking non-resident behaviors during electronic communications with the controlled-environment facility resident at 210 may include, at least, monitoring the electronic communication(s) with the controlled-environment facility resident, such as by leveraging the monitoring functions of a controlled-environment facility communication processing system (110). The controlled-environment facility communication processing system may monitor for, and/or recognize, keywords spoken by the non-resident during the electronic communication(s) with the controlled-environment facility resident. Additionally, or alternatively, the controlled-environment facility associated computer system(s) may review CDRs or VDRs from electronic communications between the non-resident and resident for noted keywords, or the like. Other behaviors monitored for in accordance with embodiments of the present systems and methods may include three-way calls, censored images, chargebacks, keywords, and the like. In such embodiments, analyzing the non-resident behaviors at 215 may comprise "scoring" "ranking," and/or "rating" monitored and/or recognized prohibited or concerning keywords spoken, three-way call attempts, display of censored image, or the like, or the lack thereof, by the non-resident, during electronic communications with the controlled-environment facility resident.

In some implementations, such as where the information tracked at 210 is information related to electronic communications between the non-resident and the controlled-environment facility resident gathered by the controlled-environment facility associated computer system(s), the analysis at 215 is performed separately from, and/or with, the analysis of the non-resident behaviors during the electronic communications with the controlled-environment facility resident and (additional) rewards are provided, at 220, to the non-resident (account) based on good behaviors determined by the analysis of the information related to electronic communications between the non-resident and the controlled-environment facility resident. For example, the information gathered at 210 may be related to support provided to the non-resident to enable electronic communications between the non-resident and the controlled-environment facility resident, and the analysis at 215 may concern the amount (e.g., number or scope of support tickets) required by the non-resident to enable electronic communications between the non-resident and the controlled-environment facility resident, the non-resident's cooperation with support efforts, etc., and the rewards may be made, or adjusted, at 220 based thereupon. In another, or further, example, the information gathered at 210 may be related to a communications billing history of the non-resident with respect to electronic communications with the same and/or other controlled-environment facility residents. Such billing history may include a number and/or amount of chargebacks related to one or more electronic communications with the same and/or other controlled-environment facility residents and the analysis may be made at 215, and rewards may be made, and/or adjusted, at 220 based thereupon.

Embodiments of the present systems and methods for providing communications rewards to non-residents associated with controlled-environment facility residents, as described herein, may be implemented at least in part as, or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIG. 2, and/or a computer system such as computer system 300 may be used as part of, one or more of: controlled environment facility communication processing system 110; controlled-environment facility vendor datacenter 115 elements, such as controlled-environment facility management system 125, controlled-environment facility resident account management system 130, non-resident account management system 135, and/or the like; controlled-environment facility resident communication and/or media devices 140 or 150; non-resident communications device 170; and/or the like. In various embodiments two or more of these computer systems may be configured to communicate with each other in any suitable way, such as, for example, via public network 120, which may be the Internet, or the like, as discussed above, via a local area network using wired or wireless functionality, etc.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, system memory 320 may include program instructions 325, configured to implement certain embodiments described herein, and data storage 335, comprising various data may be accessible by program instructions 325. In an embodiment, program instructions 325 may include software elements, which may be configured to affect the operations discussed in FIGS. 1 and 2. Program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A rewards system for providing non-residents associated with a controlled-environment facility resident rewards for good behaviors related to electronic communications with a controlled-environment facility resident, the system comprising:
   one or more controlled-environment facility associated computer systems, comprising:
      at least one processor; and
      memory coupled to the at least one processor, the memory configured to store program instructions executable by the at least one processor to cause the one or more controlled-environment facility associated computer systems to:
      maintain a non-resident electronic communications behavior evaluation system;
      monitor and/or track a non-resident's behaviors with respect to electronic communications with a controlled-environment facility resident;
      analyze the non-resident behavior with respect to the electronic communications with the controlled-environment facility resident;
      provide rewards to the non-resident for use toward electronic communications with the controlled-environment facility resident based on good behavior determined by the analysis of the non-resident behavior with respect to the electronic communications with the controlled-environment facility resident;
      gather information related to electronic communications between the non-resident and the controlled-environment facility resident comprising one or more support tickets and/or a communications billing history of the non-resident with respect to electronic communications with the same and/or other controlled-environment facility residents;

analyze, separately and/or with the non-resident behavior with respect to the electronic communications with the controlled-environment facility resident, the information related to electronic communications between the non-resident and the controlled-environment facility resident; and provide the same or other rewards to the non-resident for use toward electronic communications with the controlled-environment facility resident based on good behavior determined by the analysis of the information related to electronic communications between the non-resident and the controlled-environment facility resident.

2. The system of claim 1, wherein the one or more controlled-environment facility associated computer systems monitor and/or track the non-resident's behavior during the electronic communications with the controlled-environment facility resident.

3. The system of claim 1, wherein the one or more controlled-environment facility associated computer systems monitor and/or track the non-resident's behavior during the electronic communications with the controlled-environment facility resident by, at least, monitoring the electronic communications with the controlled-environment facility resident for, and/or recognizing, keywords spoken by the non-resident during electronic communications with the controlled-environment facility resident.

4. The system of claim 1, wherein the billing history comprises a number and/or amount of chargebacks related to one or more electronic communications with the same and/or other controlled-environment facility residents.

5. The system of claim 1, wherein the one or more controlled-environment facility associated computer systems further:
gather information related to support provided to the non-resident to enable electronic communications between the non-resident and the controlled-environment facility resident;
analyze the information related to support provided to the non-resident to enable electronic communications between the non-resident and the controlled-environment facility resident; and
provide the same or other rewards to the non-resident for use toward electronic communications with the controlled-environment facility resident based on good behavior determined by the analysis of the information related to support provided to the non-resident to enable electronic communications between the non-resident and the controlled-environment facility resident.

6. The system of claim 5, wherein the information related to support provided to the non-resident to enable electronic communications between the non-resident and the controlled-environment facility resident comprise one or more support tickets.

7. The system of claim 1, wherein the reward comprises one or more free electronic communication sessions with the controlled-environment facility resident.

8. The system of claim 1, wherein the one or more controlled-environment facility associated computer systems enable the non-resident to redeem the reward, and/or tie the reward to an account of the resident, for communications and/or purchase of media.

9. The system of claim 1, wherein the one or more controlled-environment facility associated computer systems enable the non-resident to deposit one or more rewards in an account for the controlled-environment facility resident.

10. A method for providing rewards to a non-resident associated with a controlled-environment facility resident, the method comprising:
maintaining, by a controlled-environment facility associated computer system, a non-resident electronic communication behavior evaluation system;
monitoring and/or tracking, by the controlled-environment facility associated computer system, non-resident behavior during electronic communications with the controlled-environment facility resident;
analyzing, by the controlled-environment facility associated computer system, the non-resident behavior during electronic communications with the controlled-environment facility resident;
providing, by the controlled-environment facility associated computer system, rewards to the non-resident for use toward electronic communications with the controlled-environment facility resident based on resulting analysis of the non-resident behavior during electronic communications with the controlled-environment facility resident;
gathering information related to electronic communications between the non-resident and the controlled-environment facility resident comprising one or more support tickets and/or a communications billing history of the non-resident with respect to electronic communications with the same and/or other controlled-environment facility residents;
analyzing, separately and/or with the non-resident behavior during electronic communications with the controlled-environment facility resident, the information related to electronic communications between the non-resident and the controlled-environment facility resident; and
providing the same or other rewards to the non-resident for use toward electronic communications with the controlled-environment facility resident based on good behavior determined by the analysis of the information related to electronic communications between the non-resident and the controlled-environment facility resident.

11. The method of claim 10, wherein monitoring and/or tracking non-resident behavior during electronic communications with the controlled-environment facility resident comprises, at least, monitoring the electronic communications with the controlled-environment facility resident for, and/or recognizing, keywords spoken by the non-resident during electronic communications with the controlled-environment facility resident.

12. The method of claim 10, wherein the billing history comprises a number and/or amount of chargebacks related to one or more electronic communications with the same and/or other controlled-environment facility residents.

13. The method of claim 10, further comprising:
gathering information related to support provided to the non-resident to enable electronic communications between the non-resident and the controlled-environment facility resident;
analyzing, separately and/or with the non-resident behavior during electronic communications with the controlled-environment facility resident, the information related to support provided to the non-resident to enable electronic communications between the non-resident and the controlled-environment facility resident; and providing the same or other rewards to the non-resident for use toward electronic communications with the controlled-environment facility resident based on good behavior determined by the analysis of the information related to support provided to the non-resident to enable electronic communications between the non-resident and the controlled-environment facility resident.

14. The method of claim 10 where the reward comprises one or more electronic communications sessions with the controlled-environment facility resident.

15. The method of claim 10, further comprising, enabling the non-resident to redeem the reward, and/or tie the reward to an account of the resident, for communications and/or purchase of media.

16. The method of claim 10, further comprising, enabling the non-resident to deposit one or more rewards in an account for the controlled-environment facility resident.

17. A method for providing rewards to a non-resident associated with a controlled-environment facility resident, the method comprising:

maintaining, by a controlled-environment facility associated computer system, a non-resident electronic communication behavior evaluation system;

monitoring and/or tracking, by the controlled-environment facility associated computer system, non-resident behavior during electronic communications with the controlled-environment facility resident;

analyzing, by the controlled-environment facility associated computer system, the non-resident behavior during electronic communications with the controlled-environment facility resident;

providing, by the controlled-environment facility associated computer system, rewards to the non-resident for use toward electronic communications with the controlled-environment facility resident based on resulting analysis of the non-resident behavior during electronic communications with the controlled-environment facility resident;

gathering information related to support provided to the non-resident to enable electronic communications between the non-resident and the controlled-environment facility resident;

analyzing, separately and/or with the non-resident behavior during electronic communications with the controlled-environment facility resident, the information related to support provided to the non-resident to enable electronic communications between the non-resident and the controlled-environment facility resident; and providing the same or other rewards to the non-resident for use toward electronic communications with the controlled-environment facility resident based on good behavior determined by the analysis of the information related to support provided to the non-resident to enable electronic communications between the non-resident and the controlled-environment facility resident.

18. The method of claim 17 where the reward comprises one or more electronic communications sessions with the controlled-environment facility resident.

19. The method of claim 17, further comprising, enabling the non-resident to redeem the reward, and/or tie the reward to an account of the resident, for communications and/or purchase of media.

20. The method of claim 17, further comprising, enabling the non-resident to deposit one or more rewards in an account for the controlled-environment facility resident.

* * * * *